March 11, 1930.  W. G. MAYER  1,749,884
VEHICLE TOP STRUCTURE
Filed Jan. 14, 1927
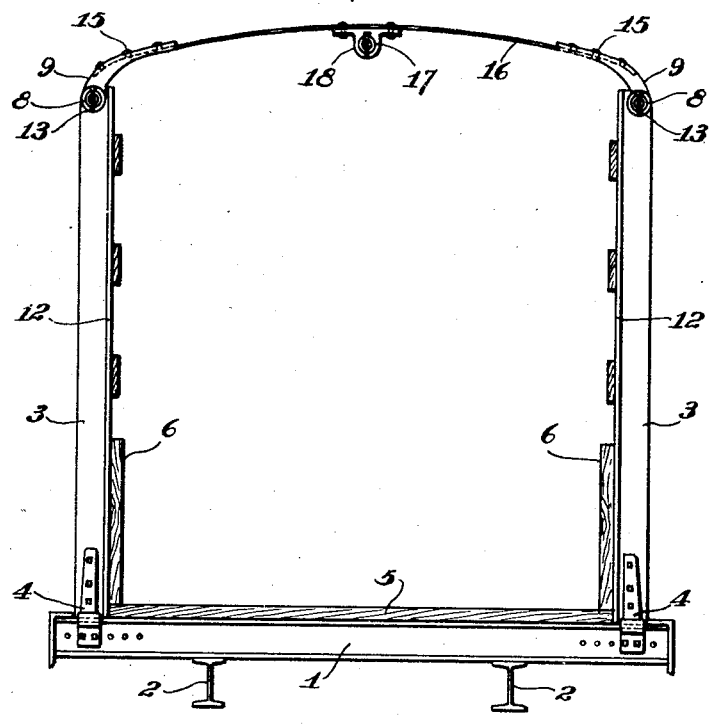
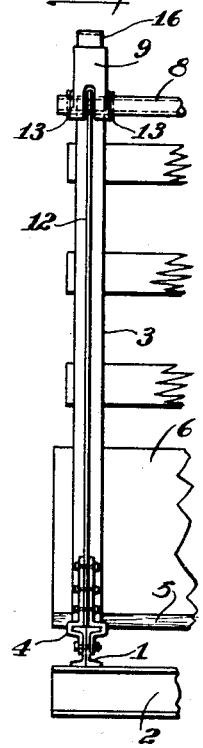
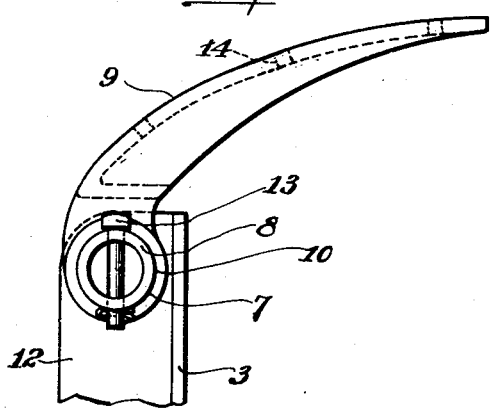
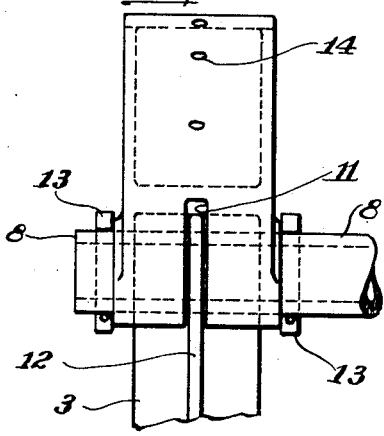
WITNESSES
INVENTOR
William G. Mayer
by Winter Brown & Critchlow
his Attorneys Patented Mar. 11, 1930

1,749,884

UNITED STATES PATENT OFFICE

WILLIAM G. MAYER, OF PITTSBURGH, PENNSYLVANIA

VEHICLE TOP STRUCTURE

Application filed January 14, 1927. Serial No. 161,171.

This invention relates to vehicle body construction, and more particularly to an improvement in the structural elements of truck bodies and the manner of joining the same.

It is among the objects of the invention to provide supporting brackets for the top or cover structure of vehicle bodies which shall be relatively simple and inexpensive and which shall greatly facilitate the assembly of the body and the supporting frame structure for the top thereof.

Another object of the invention is to provide a vehicle body in which the top or cover support comprises a plurality of supporting brackets which are adapted to be joined to the side frames of the vehicle body in a simple manner and which shall be adapted to adjust themselves to the normal position which they assume when the top or cover is assembled.

Still another object of the invention is to provide supporting brackets for vehicle tops or the like which shall be attached to the vehicle body or side frame portions in a manner to relieve the stresses on the cover portion to which it may otherwise be subjected if rigidly secured to the vehicle side frames.

In the accompanying drawings constituting a part hereof and in which like reference characters designate like parts, Fig. 1 is an end elevational view partly in section of a vehicle body embodying the principles of this invention; Fig. 2 is a side elevational view of an enlarged detail illustrating the manner of attaching the body to the sub-frame portion by securing the vertical side frames thereof to which the top or cover supporting brackets are secured; Fig. 3 is an enlarged detail view of the supporting brackets assembled with the vehicle side frame; and Fig. 4 is an elevational view of the assembled supporting bracket when viewed from the side of the vehicle.

Referring to the several figures of the drawing, the structure therein illustrated comprises a sub-frame 1 supported on the side frame portions 2 of a chassis, a plurality of vertical side frames 3 comprising T-bars spaced longitudinally of the vehicle and secured to the sub-frame by suitable clamps 4, Fig. 2, and a body portion 5 and 6, which is attached to the frame portion as shown.

The vertical side frames 3 are provided at their upper ends with openings 7 adapted to receive hollow tubular sections or pipes 8. A plurality of supporting brackets 9 provided with openings 10 and slots 11 are secured to the side frames 3 as shown in Figs. 3 and 4 by placing the slotted portion 11 over the web 12 so that the openings 10 of the brackets register with the openings of the side frames. The pipes 8 are disposed through openings 10 to hold the several elements in their assembled position, and retaining pins 13 inserted through perforations in pipes 8 on each side of openings 10 in brackets 9, which prevent the movement of the pipes relative to the brackets and the frames 3 or T-bars.

The supporting brackets 9 are provided with perforations 14 adapted to receive rivets or bolts 15, Fig. 1, by means of which transverse straps 16 are secured at their respective ends to a pair of opposed supporting brackets in transverse alignment. Secured to the straps 16 are brackets 17 which are adapted to receive a tube or pipe 18 that constitutes a central, longitudinal brace for the top or cover frame.

As shown in Fig. 1, the supporting brackets 9 and transverse straps 16 constitute the frame structure for the cover which may be placed thereon and secured thereto in any suitable manner. The supporting brackets 9 and transverse straps 16 may constitute a transverse brace for the side portions of the vehicle body where a covering is dispensed with.

It is evident from the foregoing description of this invention that the supporting brackets illustrated therein and the manner of their attachment to the side frame portions of a vehicle body provides a simple and efficient means for supporting and attaching a top or cover structure to a vehicle body. The brackets are adapted to be assembled or dismembered without the need of special tools by simpy removing the retaining pin 13 and drawing the pipe or tubing 8 out of the side frames 3.

I claim:

1. In a vehicle body structure, a frame, a plurality of structural section side braces secured to the frame at spaced intervals along the sides thereof, the braces on each side being provided adjacent their upper ends with openings aligned longitudinally of the frame, top brackets each having a slotted portion engaging said structural section and provided with an opening aligned with that of the brace, readily removable tubular members disposed in said openings for connecting the brackets to the braces, and top braces connected to said brackets extending inwardly from each side over the body.

2. In a vehicle body structure, a frame, a plurality of opposed T-section side braces secured to the frame at spaced intervals along the sides thereof, one leg of each of said braces being transverse of the frame and provided adjacent its upper end with an opening, the openings on each side being aligned longitudinally of the body, top brackets each comprising a slotted portion engaging said leg and an arm portion integral with the slotted portion, the slotted portion having an opening aligned with the opening in the brace, a single tubular member removably disposed in the openings on each side of the frame for holding said brackets in position, and top braces connected to said bracket arms extending toward each other over the body.

In testimony whereof, I sign my name.

WILLIAM G. MAYER.